United States Patent

Kunimitsu et al.

[11] Patent Number: 5,819,796
[45] Date of Patent: Oct. 13, 1998

[54] FUEL STORAGE SYSTEM

[75] Inventors: Masafumi Kunimitsu; Kiyoshi Mori; Tomokazu Muraguchi, all of Okazaki; Yoichiro Ando, Seto, all of Japan

[73] Assignee: Mitsubishi Jidosha Kogyo Kabushiki Kaisha, Tokyo, Japan

[21] Appl. No.: 622,165

[22] Filed: Mar. 27, 1996

[30] Foreign Application Priority Data

Mar. 27, 1995 [JP] Japan ................................ 7-068220

[51] Int. Cl.⁶ ................................................ F02M 39/00
[52] U.S. Cl. ............................ 137/587; 141/59; 123/519
[58] Field of Search ........................... 137/587; 123/519; 141/59

[56] References Cited

U.S. PATENT DOCUMENTS

| | | | |
|---|---|---|---|
| 4,701,198 | 10/1987 | Uranishi et al. | 137/587 |
| 4,790,283 | 12/1988 | Uranishi et al. | 123/519 |
| 4,944,779 | 7/1990 | Szlaga et al. | 123/519 |
| 5,103,877 | 4/1992 | Sherwood et al. | 123/519 |
| 5,123,459 | 6/1992 | Toshihiro | 137/587 |
| 5,215,132 | 6/1993 | Kobayashi | 137/587 |
| 5,404,906 | 4/1995 | Aoshima et al. | 123/519 |
| 5,570,672 | 11/1996 | Kunimitsu et al. | 137/587 |

*Primary Examiner*—A. Michael Chambers

[57] ABSTRACT

The fuel storage system includes a control valve having a valve body which is movable along the inner circumferential wall surface of a filler pipe and which defines a passage isolated from the inner space of the filler pipe. A fuel tank and a canister communicate with each other via a main vapor line. When a fuel cap is attached to the filler port of the filler pipe, the valve body of the control valve is pushed by the fuel cap to be shifted away from the filler port, whereby a first sub-vapor line extending between the fuel tank and the control valve via the passage defined by the valve body is communicated to a second sub-vapor line extending between the control valve and the middle part of the main vapor line, permitting evaporative fuel gas to be introduced from the fuel tank into the canister. When a feed nozzle is inserted into the filler pipe to open a lid disposed therein, the valve body is shifted toward the filler port to allow the second sub-vapor line to communicate to the inner space of the filler pipe, to permit evaporative fuel gas to be introduced from the fuel tank into the filler pipe, preventing inflow of the outside air through the filler port attributed to drop in the internal pressure of the filler pipe, and generation of fresh evaporative fuel gas. Lowering in the refueling performance and over-refueling can be also prevented.

20 Claims, 6 Drawing Sheets

FUEL STORAGE SYSTEM

BACKGROUND OF THE INVENTION

1. Field of the Invention

The present invention relates to a fuel storage system which prevents dissipation of evaporative fuel gas into the atmosphere and which provides improved refueling performance.

2. Description of Related Art

Engines installed in motor vehicles and the like emit harmful substances such as carbon monoxide, nitrogen oxides and hydrocarbons (HC). For example, unburned HC gas contained in blowby gas or in exhaust gas is emitted to the atmosphere, and also evaporative fuel gas generated in the fuel tank and containing HC as its main component is dissipated into the atmosphere. Motor vehicles are, therefore, equipped with systems for suppressing the emission of harmful substances, such as a blowby gas recirculation system, an exhaust gas purification system, a fuel evaporative emission treatment system, and an ORVR (Onboard Refueling Vapor Recovery) system. Further, in some gas stations, a special refueling system capable of sucking in evaporative fuel is installed in order to suppress the emission of harmful substances.

The fuel evaporative emission treatment system serves to prevent evaporative fuel from dissipating into the atmosphere from the fuel tank, and is typically provided with a canister 6, having an adsorbent such as activated charcoal 6a filled in a container thereof, for adsorbing HC components in the evaporative fuel, as shown in FIG. 1. The container has an inlet port communicating with a fuel tank 1, an outlet port communicating with the intake pipe of an engine, and a vent port opening to the atmosphere. In this type of canister storage-type fuel evaporative emission treatment system, when the engine is at rest, evaporative fuel gas is introduced into the canister 6 through a vent hose 5 so that HC components in the gas may be absorbed by the activated charcoal 6a. When the engine is operated thereafter, the negative pressure of suction air produced in the intake pipe is allowed to act upon the outlet port to introduce purge air through the vent port. Thus, the HC components of evaporative fuel gas adsorbed by the activated charcoal 6a are separated therefrom by the purge air, and the separated HC components are discharged into the intake pipe together with the purge air. The HC components thus discharged into the intake pipe are burned together with air-fuel mixture in engine cylinders, thus preventing the emission of evaporative fuel into the atmosphere.

When fuel is supplied to the fuel tank 1 from a feed nozzle of a feed gun inserted into a fuel filler pipe 2, negative pressure is generated inside the filler pipe 2 due to aspiration occurred under discharging of fuel out of the feed gun. Consequently, the outside air is drawn into the filler pipe 2 through the gap between the filler pipe 2 and the feed gun. The-outside air then flows into the fuel tank 1 together with the fuel discharged from the feed nozzle. The air thus introduced accelerates the evaporation of the fuel in the fuel tank 1 and increases the quantity of evaporative fuel gas in the tank 1.

If evaporative fuel gas is introduced into the canister 6 in a quantity exceeding the HC adsorption capacity of the canister 6, the HC components in the evaporative fuel gas which failed to be adsorbed by the canister 6 are dissipated into the atmosphere through the vent port.

In order to prevent the dissipation of increased evaporative fuel, the canister capacity may be increased so that it can cope with the increase in the quantity of evaporative fuel caused by the inflow of air. However, a large-capacity canister takes up a large installation space and is heavy in weight, which is not preferable from the viewpoint of downsizing and weight reduction of motor vehicles.

In the system shown in FIG. 1, the evaporative fuel gas is adapted to flow from the fuel tank 1 into the filler pipe 2 through a breather pipe 4 providing communication between the overhead space 10 in the fuel tank 1 above the fuel level and the inner space of the filler pipe 2, thus avoiding lowering in the refueling performance to be caused by the rise in the internal pressure of the fuel tank 1. Further, drop in the internal pressure of the filler pipe during refueling can be moderated. However, the evaporative fuel gas sometimes leaks into the atmosphere during refueling through the clearance between the feed nozzle and the inner circumference of the filler pipe 2.

The ORVR system (not shown) serves to prevent the dissipation of evaporative fuel gas from the fuel tank, and typically has a fuel trap in the filler pipe 2, which trap is formed by concavely bending that end portion of the filler pipe 2 which is located inside the fuel tank 1. The fuel trap is positioned at a lower level than an outlet port of the filler pipe 2, so that fuel remains in the trap even when the level of the fuel in the fuel tank 1 becomes lower than the outlet port of the filler pipe. Namely, fuel always remains in the fuel trap, and the trapped fuel serves to block the communication between the fuel tank 1 and the outside of the same via the feed pipe at all times. Accordingly, even when a filler port of the filler pipe 2 is opened under refueling, the evaporative fuel gas in the overhead space of the fuel tank 1 is never dissipated into the atmosphere through the filler pipe 2. Since the communication between the fuel tank and the filler port side of the filler pipe is shut off by the trapped fuel in the fuel trap, the fuel once supplied to the fuel tank via the filler pipe is prevented from flowing back to the filler pipe.

In the fuel tank equipped with the ORVR system, however, if the outside air is drawn through the filler pipe 2 into the fuel tank 1 during refueling, the quantity of evaporative fuel gas in the fuel tank 1 is increased due to the inflow of air. Accordingly, in the event a quantity of evaporative fuel gas exceeding the adsorption capacity of the canister 6 is introduced into the canister 6, the evaporative fuel gas is dissipated into the atmosphere through the canister 6.

In the fuel storage system shown in FIG. 2, an overfueling preventive valve 9, which is disposed in a vent pipe 5 connecting the fuel tank 1 to the canister 6, is adapted to be closed during refueling. Accordingly, flowing of the evaporative fuel gas into the canister 6 and in turn dissipation of the evaporative fuel gas into the atmosphere through the canister 6 can be prevented from occurring during refueling. However, like the system shown in FIG. 1, the evaporative fuel gas sometimes leaks into the atmosphere through the clearance between the feed nozzle and the inner circumference of the filler pipe 2.

The refueling system having the function of sucking in evaporative fuel is directed to prevent evaporative fuel gas from being discharged into the atmosphere from the fuel tank during refueling. As shown in FIG. 3, this refueling system includes a feed gun 100, a double-wall type fuel feed hose 111, a fuel storage tank 112 and a bellows-type suction duct 113. The suction duct 113 is attached to the feed gun 100 so as to surround a feed nozzle 114 of the gun 100. When the feed nozzle 114 is inserted into the filler pipe 2, the filler port of the filler pipe 2 is hermetically closed by the suction duct 113. When the refueling system is operated in this state, the fuel in the fuel storage tank 112 is introduced to the feed nozzle 114 through the inner tube of the fuel feed hose 111, and then is supplied from the nozzle 114 into the fuel tank 1 through the filler pipe 2. On the other hand, the evaporative fuel gas in the fuel tank 1 is drawn under suction into the fuel storage tank 112 through the filler pipe 2, the gap between the feed nozzle 114 and the suction duct 113, and the outer tube of the fuel feed hose 111, thus preventing the evaporative fuel gas from dissipating from the fuel tank 1 into the atmosphere.

Some refueling systems having the above evaporative fuel suction function are associated with an autostop mechanism for preventing the oversupply of fuel. The autostop mechanism is designed to automatically stop the supply of fuel when a detection hole 115 formed in the feed nozzle 114 is submerged in the fuel.

The refueling system having both the evaporative fuel suction function and the automatic fuel supply stopping function can sometimes automatically stop the fuel supply during refueling of the fuel tank, although such interruption is not actually required. Namely, in this refueling system, an excessive negative pressure can be produced within the filler pipe 2 in the vicinity of the feed nozzle 114. In such cases, the fuel flows back toward the feed nozzle 114 and to allow the detection hole to be submerged in the fuel, actuating the autostop mechanism.

SUMMARY OF THE INVENTION

An object of the present invention is to provide a fuel storage system in which evaporative fuel gas is prevented from dissipating into the atmosphere.

Another object of the present invention is to provide a fuel storage system which can provide improved refueling performance.

A fuel storage system according to one aspect of the present invention comprises a fuel tank mounted on a vehicle; a filler pipe connected to the fuel tank and having a filler port at a distal end thereof; evaporative gas adsorbing means for adsorbing an evaporative fuel gas generated in the fuel tank; a vapor passage extending between the fuel tank, the evaporative gas adsorbing means and the filler pipe; at least one control valve disposed in the vapor passage between the evaporative gas adsorbing means and the filler pipe; and communication/shut-off control means for controlling the at least one control valve such that the fuel tank and the evaporative gas adsorbing means may communicate with each other under nonrefueling, whereas the evaporative gas adsorbing means and the filler pipe may communicate with each other under refueling.

According to this fuel storage system, the evaporative fuel gas in the fuel tank is introduced to the evaporative gas adsorbing means through the vapor passage under nonrefueling to be prevented from dissipating into the atmosphere. Meanwhile, when the internal pressure of the filler pipe is caused to drop by aspiration occurring during refueling, the outside air is introduced to the evaporative gas adsorbing means, like the introduction of purge air, to allow the fuel component to be released from the evaporative gas adsorbing means. Since the evaporative gas adsorbing means and the filler pipe communicate with each other via the vapor passage during refueling, the fuel component (evaporative fuel gas) released from the evaporative gas adsorbing means is introduced into the filler pipe. Thus, inflow of the outside air through the filler port attributed to the drop in the internal pressure of the filler pipe can be prevented from occurring to avoid generation of evaporative fuel gas which can be caused by such inflow of the outside air. Accordingly, the evaporative gas adsorbing means can be downsized. Further, when the fuel tank is refueled using a refueling system having the function of sucking in evaporative fuel, the refueling operation is not interrupted unnecessarily by the drop in the internal pressure of the filler pipe. In addition, since the evaporative fuel gas in the fuel tank does not flow into the filler pipe through the vapor passage during refueling, the amount of the evaporative fuel gas to be dissipated through the filler port into the atmosphere can be minimized.

Preferably, the fuel storage system further comprises a main vapor passage extending between the fuel tank and the evaporative gas adsorbing means. In this case, the evaporative fuel gas in the fuel tank can be introduced to the evaporative gas adsorbing means under nonrefueling and refueling.

More preferably, the vapor passage communicates via the main vapor passage to the evaporative gas adsorbing means. In this case, since a portion of the vapor passage is omitted and replaced by the downstream portion of the main vapor passage (the passage portion on the side remote from the fuel tank), the constitution of the vapor passage can be simplified. Further, since the fuel tank and the filler pipe communicate with each other via the upstream portion of the main vapor passage (the passage portion on the side close to the fuel tank) and the vapor passage, no lowering in the refueling performance is caused by increase in the internal pressure of the fuel tank.

Preferably, the fuel storage system further comprises a leveling valve, disposed in the main vapor passage, for preventing excessive rise of a fuel level in the fuel tank. In this case, if refueling is continued after the leveling valve is closed depending on the rise of the fuel level, the internal pressure of the fuel tank is increased by the shut-off in the communication between the fuel tank and the filler pipe via the vapor passage under refueling to impede further fuel feeding, thus preventing over-fueling. Accordingly, even if the volume of fuel is increased by the increase in the fuel temperature after completion of refueling, the fuel is prevented from leaking out of the fuel tank.

Preferably, the fuel storage system further comprises a cut-off valve, disposed in the vapor passage between the at least one control valve and the fuel tank, for preventing a liquid fuel from flowing out of the fuel tank into the evaporative gas adsorbing means. In this case, deterioration in the performance of the evaporative gas adsorbing means to be caused by the liquid fuel flowing into the evaporative gas adsorbing means can be prevented from occurring.

Preferably, the filler pipe has a fuel cap adapted to be removably attached to the filler port. The communication/shut-off control means controls the at least one control valve responding to attaching and detaching of the fuel cap to and from the filler port, so that the fuel tank and the evaporative gas adsorbing means may communicate with each other when the fuel cap is attached to the filler port, whereas the evaporative gas adsorbing means and the filler pipe may communicated with each other when the fuel cap is removed from the filler port. In this case, the control valve can be controlled responding to attaching and detaching of the cap, which is positively representative of whether it is under nonrefueling or refueling. Thus, the control valve, in turn, the entire fuel storage system can be operated securely as-intended. In addition, the number of control valves to be disposed can be suitably selected, and the type of the control valves can be suitably selected from the mechanically driven type and electrically driven type. Namely, this fuel storage system enjoys greater flexibility in its constitution.

Preferably, the at least one control valve is a single control valve having a valve body disposed in the filler pipe at the site where the fuel cap is to be attached. The valve body is movable between a first position where the fuel tank and the evaporative gas adsorbing means communicate with each other and a second position where the evaporative gas adsorbing means and the filler pipe communicate with each other. The communication/shut-off control means includes the fuel cap and urging means for urging the valve body toward the second position. The communication/shut-off control means moves the valve body to the first position with the aid of the fuel cap against an urging force of the urging means when the fuel cap is being attached to the filler port, and to the second position under the urging force of the urging means when the fuel cap is being removed from the filler port. In this case, only one control valve is required, and hence the constitution of the communication/shut-off control means can be simplified. Further, the entire system can be operated securely as intended.

Preferably, the filler pipe has a fuel cap adapted to be removably attached to the filler port thereof. The fuel storage system is provided with a lid which is disposed in the filer pipe and which is opened when the feed nozzle is inserted to the filler port after the fuel cap is removed from the filler port. The communication/shut-off control means controls the at least one control valve responding to attaching of the cap and to opening of the lid, so that the fuel tank and the evaporative gas adsorbing means may communicate with each other when the fuel cap is attached to the filler port, whereas the evaporative gas adsorbing means and the filler pipe may communicate with each other when the lid is open. In this case, the constitution of the communication/shut-off control means can be simplified, and the entire system can be operated as intended. Besides, the system enjoys greater flexibility in its constitution.

Preferably, the at least one control valve is a single control valve having a valve body disposed to the filler pipe at the site where the fuel cap is to be attached. The valve body is movable between a first position where the fuel tank and the evaporative gas adsorbing means communicate with each other and a second position where the evaporative gas adsorbing means and the filler pipe communicate with each other. The communication/shut-off control means includes the fuel cap and a drive member provided on the lid for pushing the valve body toward the second position when the lid is opened. The communication/shut-off control means moves the valve body to the first position with the aid of the fuel cap when the fuel cap is being attached to the filler port, and to the second position with the aid of the drive member when the fuel nozzle is inserted into the filler pipe. In this case, only one control valve is required, and hence the constitution of the communication/shut-off control means can be simplified. Further, the system can be operated securely as intended.

Preferably, the filler pipe has a fuel cap adapted to be removably attached to the filler port. The fuel storage system is provided with a lid which is disposed in the filler pipe and which is opened when a feed nozzle is inserted to the filler port after the fuel cap is removed from it and is closed when the feed nozzle is not inserted to the filler pipe. The communication/shut-off control means controls the at least one control valve responding to attaching and detaching of the fuel cap and to opening and closing of the lid, so that the fuel tank and the evaporative gas adsorbing means may communicate with each other when the feed nozzle is not inserted to the filler port, whereas the evaporative gas adsorbing means and the filler pipe may communicate with each other when the feed nozzle is inserted to the filler port. In this case, the constitution of the communication/shut-off control means can be simplified, and the entire system can be operated as intended. Besides, the system enjoys greater flexibility in its constitution.

Preferably, the vapor passage opens to the fuel tank at a level higher than the leveling valve in a height direction of the fuel tank. In this case, the liquid fuel can be prevented from flowing into the vapor passage.

Preferably, the fuel storage system further comprises flow-back preventive means disposed in the filler pipe for preventing the fuel from flowing back from the fuel tank into the filler pipe. In this case, not only the evaporative fuel gas can be prevented from flowing back from the fuel tank into the filler pipe, but also dissipation of the evaporative fuel gas into the atmosphere through the filler port during refueling can be reduced.

A fuel storage system according to another aspect of the present invention comprises a fuel tank mounted on a vehicle; a filler pipe connected to the fuel tank and having a filler port at a distal end thereof; evaporative gas adsorbing means for adsorbing an evaporative fuel gas generated in the fuel tank; a first vapor passage extending between the fuel tank and the evaporative gas adsorbing means; a second vapor passage extending between the evaporative gas adsorbing means and the filler pipe; a control valve disposed in the first vapor passage; and communication/shut-off control means for opening the control valve under nonrefueling and for closing the control valve under refueling.

According to this fuel storage system, the evaporative fuel gas in the fuel tank is introduced to the evaporative gas adsorbing means through the first vapor passage under nonrefueling to prevent the evaporative fuel gas from dissipating into the atmosphere. If the internal pressure of the filler pipe drops during refueling, the fuel component (evaporative fuel gas), released from the evaporative gas adsorbing means by the outside air flowing into the evaporative gas adsorbing means thereto, like the inflow of purge air, is introduced into the filler pipe through the second vapor passage to prevent generation of evaporative fuel gas caused by the inflow of the outside air through the filler port brought about by the drop in the internal pressure of the filler pipe. Meanwhile, when the fuel tank is refueled using a refueling system having the function of sucking in evaporative fuel, the refueling operation is not interrupted unnecessarily by the drop in the internal pressure of the filler pipe. In addition, since the evaporative fuel gas in the fuel tank does not flow into the filler pipe through the first and second vapor passages during refueling, the amount of the evaporative fuel gas to be dissipated through the filler port into the atmosphere can be reduced.

Preferably, the fuel storage system further comprises a second control valve disposed in the second vapor passage. The second control valve is closed under nonrefueling or running of the vehicle to shut off communication between the evaporative gas adsorbing means and the filler pipe. In this case, the evaporative fuel gas is prevented from flowing through the filler pipe into the evaporative gas adsorbing means under nonrefueling or running of the vehicle.

DETAILED DESCRIPTION OF THE PREFERRED EMBODIMENT

Figure 4:
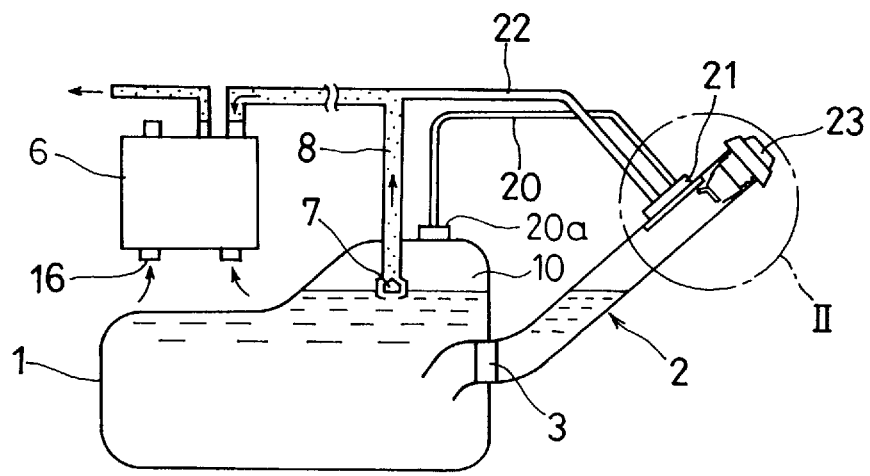
FIG. 4 is a schematic view illustrating a fuel storage system according to a first embodiment of the present invention.
Figure 5:
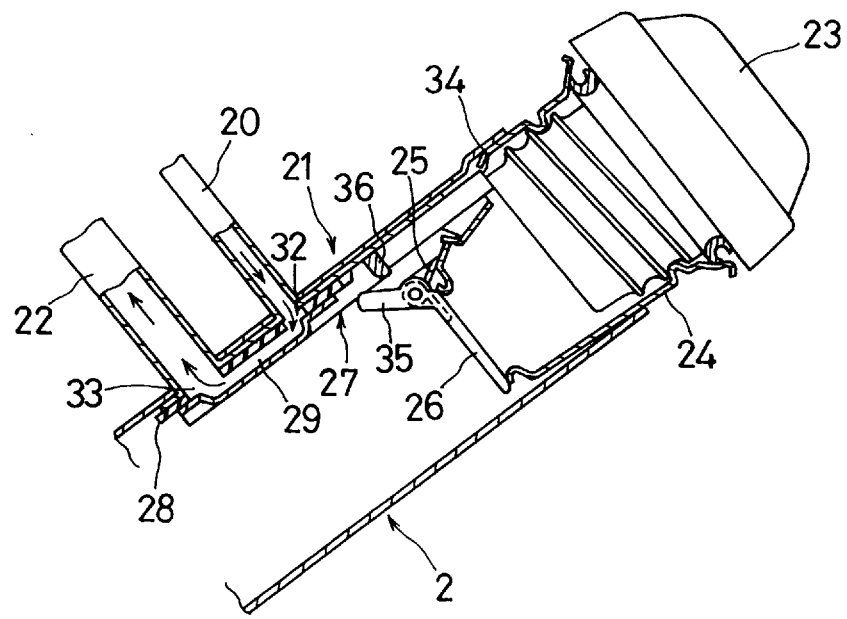
FIG. 5 is a fragmentary enlarged cross-sectional view of the control valve and peripheral elements in the circle II shown in FIG. 4.

Referring to FIG. 4, the fuel storage system according to the first embodiment of the present invention has a fuel tank 1 to which a filler pipe 2 is connected. As shown in FIG. 5, the filler pipe 2 has a filler neck 24 having a filler port (shown by reference numeral 24a in FIG. 6) at its distal end. A fuel cap 23 is adapted to be screwed into the filler neck 24, and a lid 26 is connected by a pin to the filler neck 24 at the inner opening end thereof. A lid spring 25 for urging the lid 26 in the closing direction is attached to the pin-connected portion. In FIG. 4, reference numeral 3 denotes a flow-back preventive valve disposed in the filler pipe 2 at the proximal end portion thereof. The check valve 3 is adapted to prevent the fuel and evaporative fuel gas from flowing back from the fuel tank 1 into the filler pipe 2.

As shown in FIG. 4, the fuel storage system is provided with a canister 6 which functions as evaporative gas adsorbing means for adsorbing the evaporative fuel gas generated in the fuel tank 1, and a single control valve 21 disposed on the circumferential wall of the filler pipe 2 adjacent to the filler port. A main vapor line 8, which defines a main vapor passage, extends between the fuel tank 1 and the canister 6. A first sub-vapor line 20 having a relatively small diameter extends between the fuel tank 1 and the control valve 21; whereas a second sub-vapor line 22 having a relatively large diameter extends between the control valve 21 and an intermediate part of the main vapor line 8. The first and second sub-vapor lines 20, 22 define a vapor passage extending between the fuel tank 1, filler pipe 2 and canister 6.

As shown in FIG. 5, the control valve 21 includes a valve body 27 disposed in the filler pipe 2 at the site where the fuel cap is to be attached, and a sealing plate 28, such as of a synthetic rubber, fixedly disposed between the valve body 27 and the inner circumferential surface of the filler pipe 2. The valve body 27 is supported by a support 127 (see FIG. 7) fixedly disposed in the filler pipe 2, so as to be movable between a first position shown in FIG. 5 and a second position shown in FIG. 6. A leaf spring 128 is interposed between the support 127 and the valve body 27 to urge the valve body 27 toward the sealing plate 28. The leaf spring 128 is adapted to be moved together with the valve body 27. The sealing plate 28 is formed with communicating holes 32 and 33 in alignment with the opening of the first sub-vapor line 20 opening to the filler pipe and with the opening of the second sub-vapor line 22 opening to the filler pipe, respectively.

The valve body 27 has a separating wall 27a which has end portions disposed in intimate contact with the sealing plate 28 and an intermediate portion spaced from the sealing plate 28 radially inward with respect to the filler pipe. The separating wall 27a cooperates with the sealing plate 28 and the inner circumferential wall surface of the filler pipe 2 to define, in the filler pipe 2, a passage 29 isolated from the internal space of the filler pipe 2. When the valve body 27 is at the first position shown in FIG. 5, the first sub-vapor line 20 and the second sub-vapor line 22 are allowed to communicate with each other via the communicating holes 32, 33 and the passage 29. However, these two sub-vapor lines 20, 22 are isolated from the inner space of the filler pipe 2 by the sealing plate 28 and the separating wall 27a. Meanwhile, when the valve body 27 is at the second position shown in FIG. 6, the first sub-vapor line 20 communicates to the passage 29 via the communicating hole 32 but is isolated from the inner space of the filler pipe 2 by the sealing plate 28 and the separating wall 27a. The second sub-vapor line 22 communicates via the communicating hole 33 to the inner space of the filler pipe 2.

The fuel storage system is further provided with communication/shut-off control means which controls the control valve 21 to allow the fuel tank 1 and the canister 6 to communicate with each other under nonrefueling conditions and to allow the canister 6 and the filler pipe 2 to communicate with each other under refueling conditions. The communication/shut-off control means in this embodiment includes a fuel cap 23 and a driving protrusion 35 provided on the lid 26. The driving protrusion 35 extends from the lid 26 at the portion pin-connected to the filler neck 24 toward the valve body 27 of the control valve 21. The valve body 27 has an engaging portion 36 with which the driving protrusion 35 is releasably engaged. According to this constitution, the valve body 27 is designed to be shifted by the fuel cap 23 toward the filler port to the first position shown in FIG. 5 under nonrefueling; and by the driving protrusion 35 away from the filler port to the second position shown in FIG. 5 under nonrefueling.

Referring again to FIG. 4, a leveling valve 7 for restricting excessive rise of the fuel level in the fuel tank is disposed at the end portion of the main vapor line 8 opening to the fuel tank 1. This leveling valve 7 is, for example, connected to a float (not shown) floating on the liquid surface of the fuel in the fuel tank 1 and is adapted to be closed when the fuel level reaches an acceptable level.

Meanwhile, the first sub-vapor line 20 opens to the fuel tank 1 at a level higher than the leveling valve 7. A cut-off valve 20a is disposed in the first sub-vapor line 20 at its opening which opens to the fuel tank 1. The cut-off valve 20a is designed to be closed, for example, when the liquid fuel in the fuel tank 1 happens to flow into the first sub-vapor line 20. The liquid fuel is adapted to be prevented by the cut-off valve 20a from flowing from the fuel tank 1 through the first and second vapor lines 20, 22 and the main vapor line 8 to the canister 6.

Operation of the thus constituted fuel storage system will be described below.

Under the nonrefueling state where the fuel cap 23 is attached to the filler port, the valve body 27 is situated at the first position shown in FIG. 5, and the first sub-vapor line 20 and the second sub-vapor line 22 communicate with each other via the passage 29. Accordingly, even when the amount of residual fuel in the fuel tank 1 is great and the leveling valve 7 is closed, the evaporative fuel gas present in the overhead space 10 of the fuel tank 1 can be introduced to the canister 6 through the vapor passage composed of the first and second sub-vapor lines 20, 22 and the downstream half of the main vapor line 8 (vapor line half on the side remote from the fuel tank). If the leveling valve 7 is open, the evaporative fuel gas can be introduced into the canister 6 through the main vapor line 8, as well as, through the vapor passage. The canister 6 adsorbs the evaporative fuel gas to prevent it from dissipating into the atmosphere.

Figure 6:
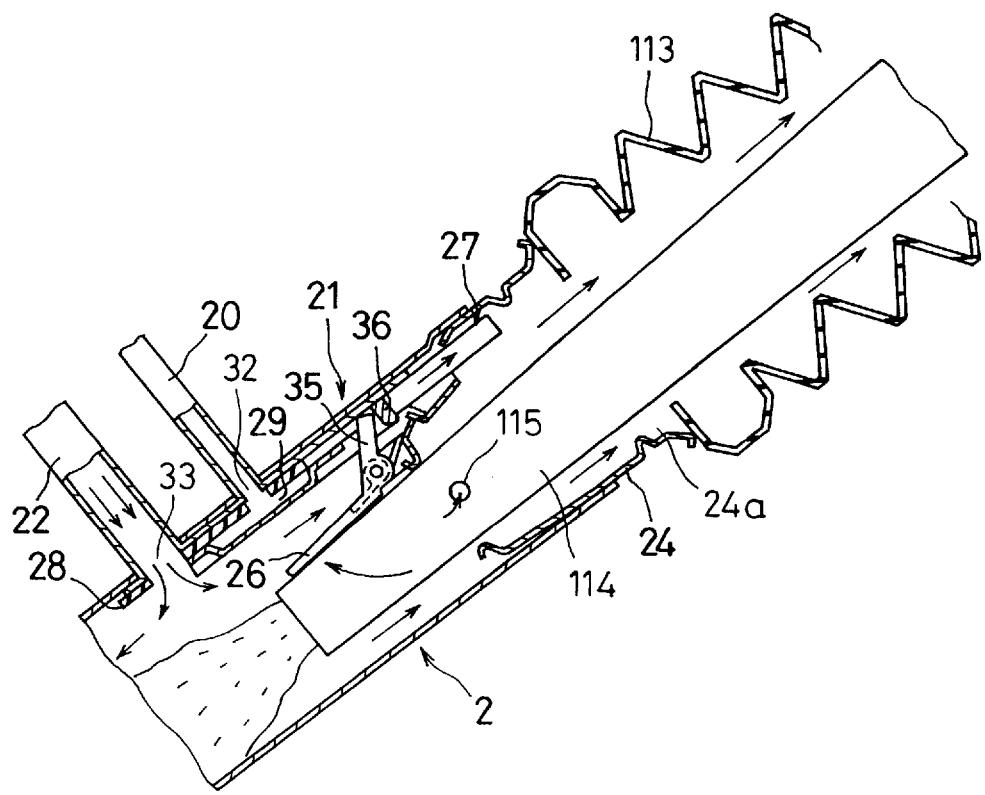
FIG. 6 is a fragmentary enlarged cross-sectional view showing how the control valve is operated during refueling.
Figure 7:
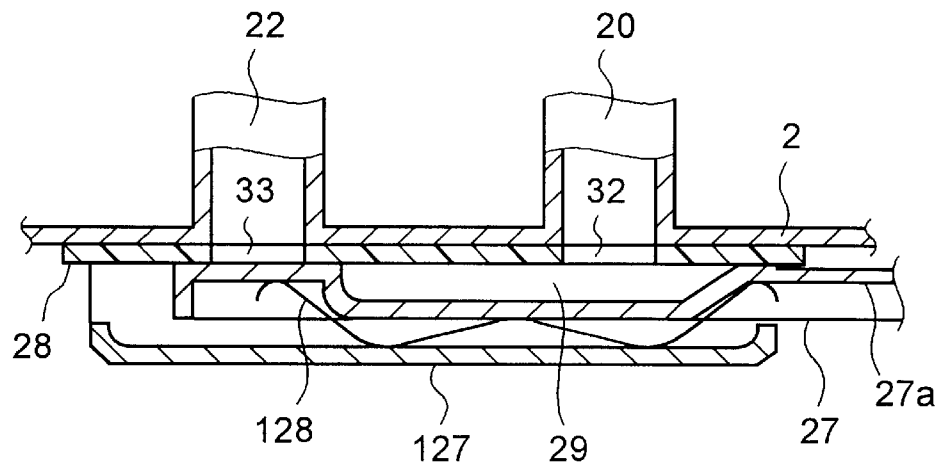
FIG. 7 is a fragmentary enlarged cross-sectional view showing the mechanism for supporting the control valve.

When the feed nozzle 114 is being inserted to the filler port 24a after the fuel cap 23 is removed from the filler pipe 2 so as to start refueling, the lid 26 starts to be turned clockwise in FIGS. 5 and 6 against the urging force of the lid spring 25. With the opening of the lid 26, the driving protrusion 35 is turned clockwise to be engaged with the engaging portion 36 of the valve body 27. When the feed nozzle 114 is inserted further to open the lid 26 fully, the valve body 27 is urged toward the filler port by the driving protrusion 35 to allow the valve body 27 to assume the second position shown in FIG. 6.

As a result, the second sub-vapor line 22 is allowed to communicate to the inner space of the filler pipe 2 via the communicating hole 33. Further, the amount of residual fuel is usually small at the start of refueling, so that the leveling valve 7 remains opened. Accordingly, the evaporative fuel gas in the fuel tank 1 is partly introduced into the filler pipe 2 through the upstream half of the main vapor line 8 (vapor line half on the side close to the fuel tank) and the second sub-vapor line 22. Particularly, when fuel is discharged from the feed nozzle 114 to cause aspiration negative pressure to be generated in the filler pipe 2 and reduce the internal pressure thereof, inflow of the evaporative fuel gas into the filler pipe 2 is accelerated to prevent the internal pressure of the filler pipe 2 from dropping. Accordingly, generation of fresh evaporative fuel gas to be caused by the inflow of the outside air through the filler port can be suppressed, so that there is little fear of the evaporative fuel gas dissipating into the atmosphere through the vent port of the canister 6, even if the canister 6 is of relatively small capacity.

Since the overhead space 10 of the fuel tank 1 communicates to the inner space of the filler pipe 2 via the upstream half of the main vapor line 8 and the second sub-vapor line 22, there occurs no substantial drop in the refueling performance attributed to excessive rise in the internal pressure of the fuel tank 1.

Further, for example, even if the main vapor line 8 is blocked due to, e.g., warping of the main vapor line 8 or if the canister 6 is clogged by dust, etc. migrated thereto, refueling operation is not interrupted by the rise in the internal pressure of the fuel tank 1, because the evaporative fuel gas can flow from the fuel tank 1 into the filler pipe 2 through the second sub-vapor line 22.

Figure 1:
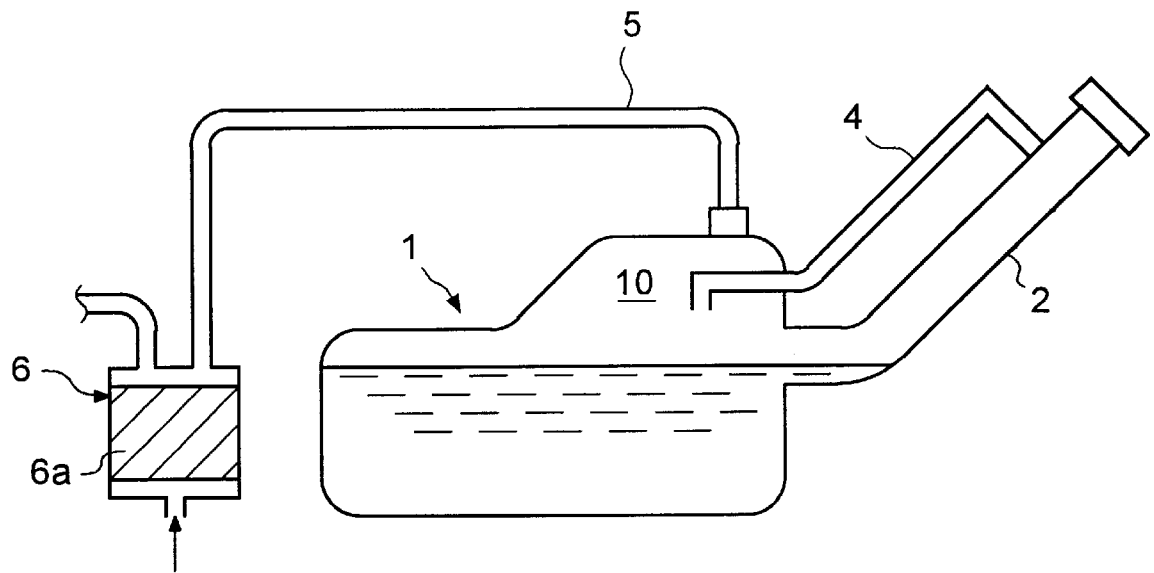
FIG. 1 is a schematic view illustrating a prior art fuel storage system.
Figure 2:
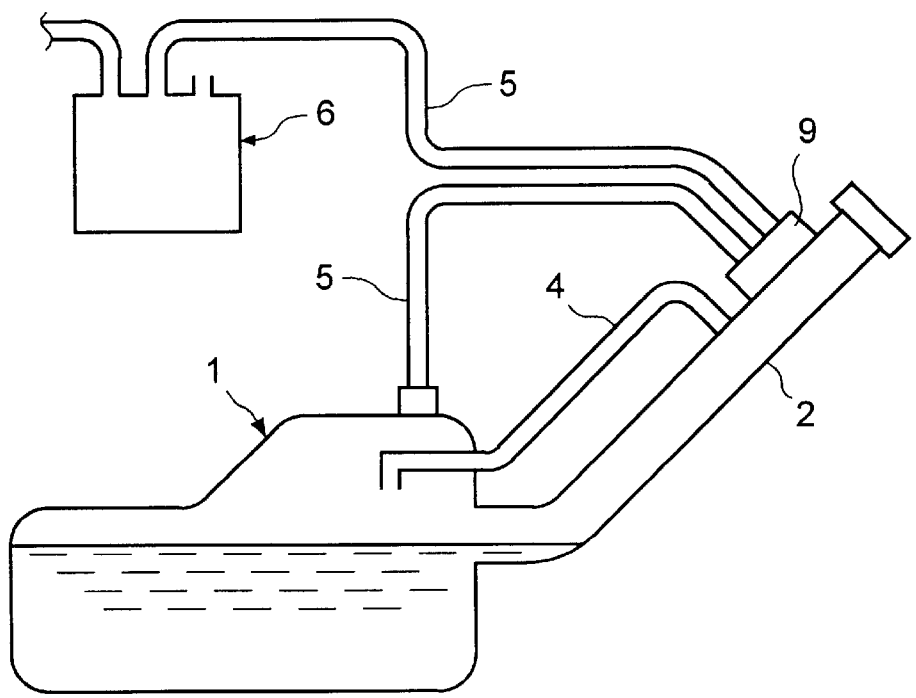
FIG. 2 is a schematic view illustrating another prior art fuel storage system.
Figure 3:
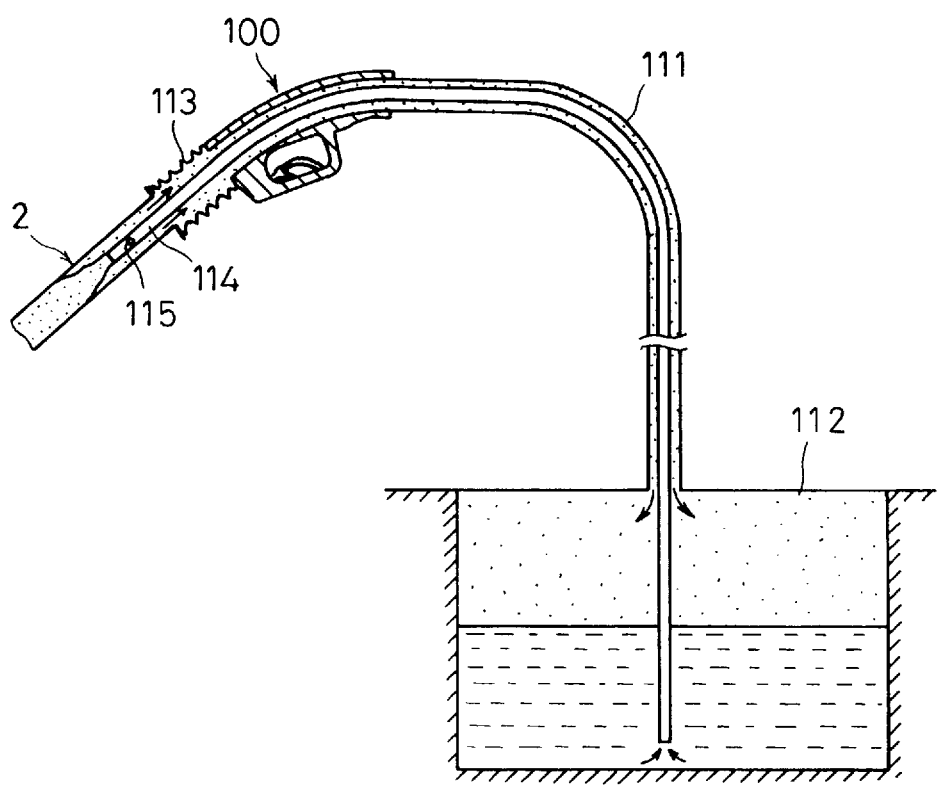
FIG. 3 is a view showing a refueling system having the function of sucking in evaporative fuel.

Even when the fuel tank 1 is to be refueled using the evaporative gas suction type refueling system shown in FIG. 3, no excessive negative pressure is generated in the filler pipe 2 or the suction duct 113 for the reasons above explained, facilitating refueling smoothly.

When the fuel level reaches an acceptable level after a while, the leveling valve 7 is closed. While the valve body 27 is situated at the second position shown in FIG. 6 under refueling to allow the first sub-vapor line 20 to open into the passage 29, the first sub-vapor line 20 is isolated from the inner space of the filler pipe 2 by the sealing plate 28 and the separating wall 27a of the valve body 27. Accordingly, if refueling is continued even after the leveling valve 7 is closed, the internal pressure of the fuel tank 1 increases to impede further fuel feeding. Thus, the fuel level is prevented from exceeding the maximum acceptable level.

When refueling is completed as described above, the feed nozzle 114 is drawn out of the filler pipe 2. Thus, the lid 26 is closed by the urging force of the lid spring 25, and the driving protrusion 35 provided on the lid 26 is disengaged from the engaging portion 36 of the valve body 27 in the control valve 21. Accordingly, the valve body 27 is movable away from the filler port. Next, when the fuel cap 23 is screwed into the filler neck 24, the bottom surface of the fuel cap 23 is abutted against that end face of the valve body 27 which opposes the filler port 2. When the fuel cap 23 is further screwed into the filler neck 24, the valve body 27 is pushed by the fuel cap 23 away from the filler port to assume the first position shown in FIG. 5. Operations of the fuel storage system when the valve body 27 is at the first position have already been described above.

Since the fuel level is restricted so as not to exceed the maximum acceptable level as described above, the fuel is prevented from flowing out of the fuel tank 1, even when the fuel is heated in the engine compartment to be expanded during running of the vehicle and the thus expanded fuel is refluxed into the fuel tank 1.

Further, the check valve 3 happens to open itself when the vehicle makes a turn and the like to allow the fuel in the fuel tank 1 to flow back into the filler pipe 2. In such cases, the fuel flowed back into the filler pipe 2 is also prevented from flowing through the second sub-vapor line 22 and the main vapor line directly into the canister 6, because the valve body 27 shuts off communication between the second sub-vapor line 22 and the filler pipe 2 under nonrefueling conditions.

Figure 8:
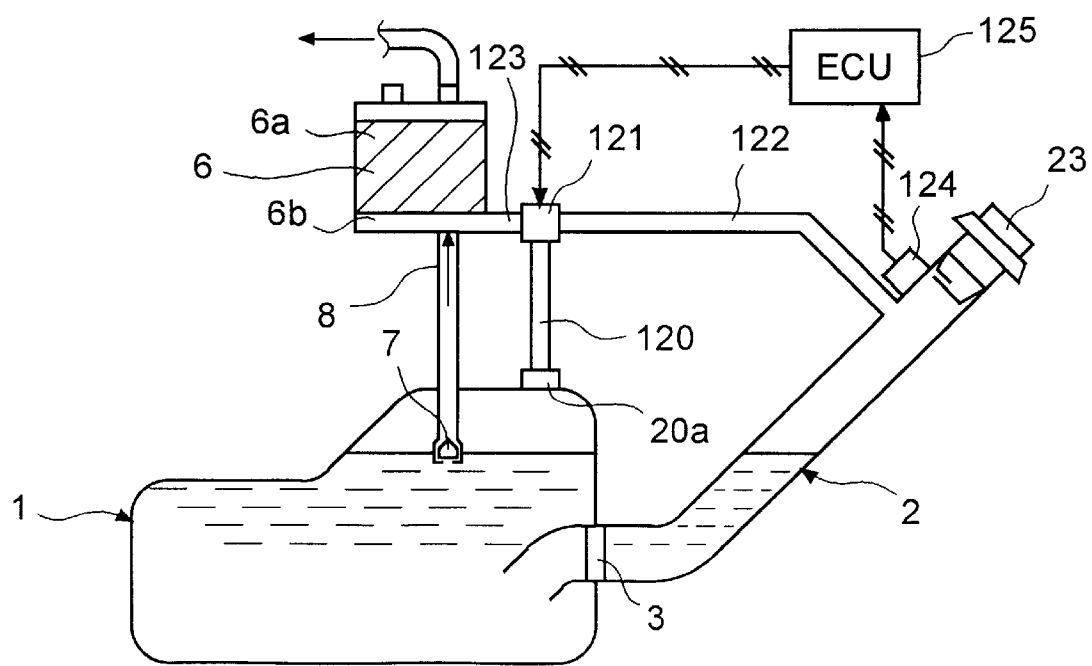
FIG. 8 is a schematic view illustrating a fuel storage system according to a second embodiment of the present invention.

A second embodiment of the fuel storage system according to the present invention will be described below referring to FIG. 8.

The fuel storage system according to this embodiment is different from that of the first embodiment in the constitutions of the vapor passage, control valve and communication/shut-off control means.

The fuel storage system in this embodiment is provided with a fuel tank 1, a filler pipe 2 connected to the fuel tank 1 and a canister 6 communicating to the fuel tank 1 via a main vapor line 8, like in the first embodiment. The filler pipe 2 contains a check valve 3, and a leveling valve 7 is disposed at the inner opening end portion of the main vapor line 8.

This embodiment is different from the first embodiment in that a first sub-vapor line 120, a second sub-vapor line 122 and a third sub-vapor line 123 constitute the vapor passage, and an electromagnetic directional control valve 121 is disposed as the control valve between these sub-vapor lines 120, 122 and 123. The first sub-vapor line 120 extends between the fuel tank 1 and a first port of the directional control valve 121, and communicates at its corresponding end to the inner space of the fuel tank 1. The second sub-vapor line 122 extends between a second port of the directional control valve 121 and that end of the filler pipe 2 which opposes the filler port, and communicates at its corresponding end to the inner space of the filler pipe 2. The third sub-vapor line 123 extends between a third port of the directional control valve 121 and an activated charcoal-free portion 6b of the canister 6, and communicates at its corresponding end to the inner space of that portion 6b. In FIG. 8, an activated charcoal-filled portion is indicated by reference numeral 6a.

The directional control valve 121 is adapted to be switched between a first position where the first sub-vapor line 120 and the third sub-vapor line 123 communicate with each other and a second position where the second sub-vapor line 122 and the third sub-vapor line 123 communicate with each other.

The communication/shut-off control means includes a switch 124 which is responsive to attaching and detaching of the fuel cap 23 to and from the filler port or to opening and closing of a lid (not shown in FIG. 7, but corresponds to the lid 26 in FIG. 5); and an electronic control unit (ECU) 125 responsive to fuel cap attaching/detaching signals or lid opening/closing signals from the switch 124. The ECU 125 is adapted to control the directional control valve 121 such that it may assume the first position when a fuel cap attaching signal or lid closing signal is input from the switch 124 and to assume the second position when a fuel cap detaching signal or lid opening signal is input from the switch 124.

A operations of the thus constituted fuel storage system are the same as those of the first embodiment, they will be described briefly.

The directional control valve 121 is at the first position under nonrefueling to allow the first sub-vapor line 120 and the third sub-vapor line 123 to communicate with each other. Accordingly, even when the leveling valve 7 is closed, the evaporative fuel gas generated in the fuel tank 1 can be introduced to the canister 6 through these sub-vapor lines 120, 123.

When the fuel cap 23 is removed from the filler port so as to start refueling, or when the feed nozzle is inserted into the filler pipe 2 to open the lid 26, a fuel cap detaching signal or lid opening signal is fed from the switch 124 to the ECU 125 to switch the operational position of the directional control valve 121 from the first position to the second position under the control of the ECU 125.

Consequently, the first sub-vapor line 120 and the second sub-vapor line 122 are allowed to communicated with each other. Accordingly, the fuel tank 1 and the inner space of the filler pipe 2 are allowed to communicate with each other via the sub-vapor lines 120, 122 so that the evaporative fuel gas in the fuel tank 1 can be partly introduced to the filler pipe 2. Thus, the internal pressure of the filler pipe 2 is prevented from dropping, and generation of fresh evaporative fuel gas attributed to the inflow of the outside air through the filler port can be suppressed. Besides, there occurs no substantial lowering in the refueling performance attributed to the rise in the internal pressure of the fuel tank 1. Further, when the fuel tank 1 is to be refueled using the evaporative gas suction type refueling system shown in FIG. 3, refueling can be carried out smoothly.

The first sub-vapor line 120 is isolated from the second and third sub-vapor lines 122, 123 (filler pipe 2 and canister 6) under refueling conditions. Accordingly, if refueling is continued even after the leveling valve 7 is closed, the internal pressure of the fuel tank 1 is increased to impede further fuel feeding.

When the feed nozzle is drawn out of the filler pipe 2 to close the lid 26 after completion of refueling, or when the fuel cap 23 is attached to the filler port thereafter, the operational position of the directional control valve 121 is switched back from the second position to the first position under the control of the ECU 125 which is responsive to the fuel cap attaching signal or lid closing signal fed from the switch 124. Operations of the fuel storage system in such instances have already been described.

Figure 9:
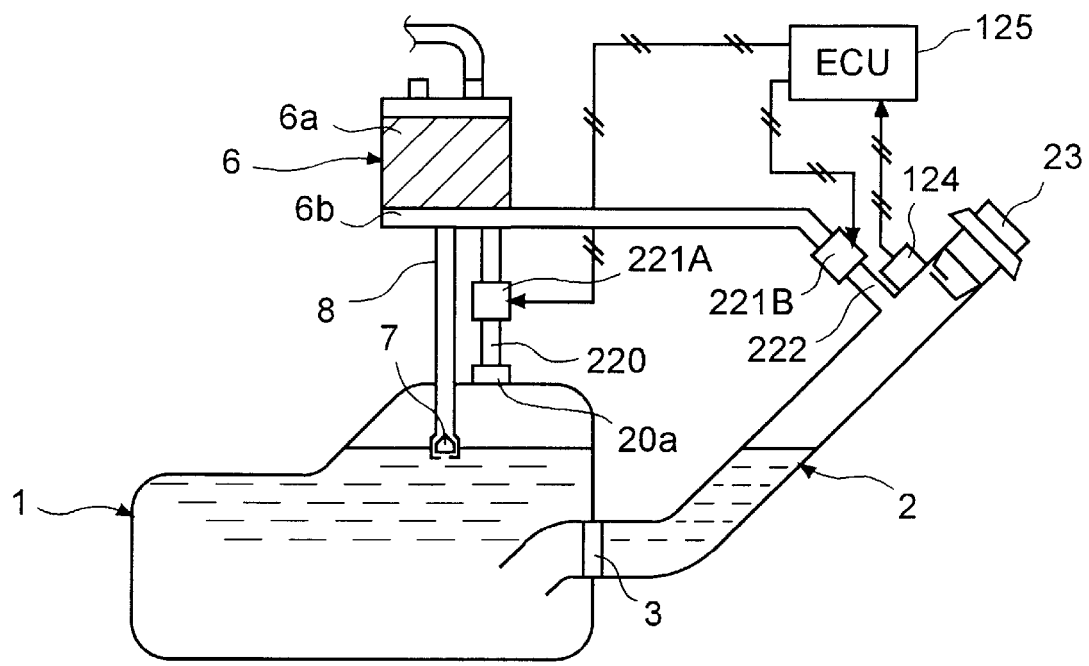
FIG. 9 is a schematic view illustrating a fuel storage system according to a third embodiment of the present invention.

A third embodiment of the fuel storage system according to the present invention will be described below referring to FIG. 9.

The fuel storage system in this embodiment is the same as that of the second embodiment except for the constitutions of the vapor passage and of the control valve.

In the system of the third embodiment, unlike the second embodiment, a first sub-vapor line 220 and a second sub-vapor line 222 constitute the vapor passage. The first sub-vapor line 220 extends between the fuel tank 1 and the activated charcoal-free portion 6b of the canister 6, and communicates at its corresponding ends to the inner space of the tank 1 and that of the portion 6b, respectively. The second sub-vapor line 222 extends between the activated carbon-free portion 6b and that end of the filler pipe 2 which opposes the filler port, and communicates at its corresponding ends to the inner space of the filler pipe 2 and that of the portion 6b, respectively. A first electromagnetic closing valve 221A and a second electromagnetic closing valve 221B are disposed as the first and second control valves in the first and second sub-vapor lines 220, 222, respectively.

The communication/shut-off control means includes a switch 124 and an ECU 125, as in the second embodiment. The ECU 125 is adapted to control these closing valves 221A, 221B such that the valve 221A may be opened and the valve 221B may be closed, when a fuel cap attaching signal or lid closing signal is input from the switch 124 and that the valve 221A may be closed and the valve 221B may be opened, when a fuel cap detaching signal or lid opening signal is input from the switch 124.

Since operations of the thus constituted fuel storage system are basically the same as those of the second embodiment, they will be briefly described below.

Under nonrefueling conditions, the first closing valve 221A is opened to allow passage of evaporative fuel gas through the first sub-vapor line 220, so that the evaporative fuel gas generated in the fuel tank 1 can be introduced to the canister 6 even when the leveling valve 7 is closed. In this instance, the second closing valve 221B is closed to stop passage of the liquid fuel through the second sub-vapor line 222.

When the feed nozzle is inserted into the filler pipe 2 to open the lid 26 after the fuel cap 23 is removed from the filler port so as to start refueling, a fuel cap detaching signal or lid opening signal is fed from the switch 124 to the ECU 125 to close the first closing valve 221A and to open the second closing valve 221B under the control of the ECU 125. Further, the leveling valve 7 is opened under refueling, since the amount of residual fuel is usually decreased. Consequently, the fuel tank 1 and the inner space of the filler pipe 2 communicate with each other via the main vapor line 8, the activated carbon-free portion 6b of the canister 6 and the second sub-vapor line 222, and thus the evaporative fuel gas in the fuel tank 1 can be partly introduced into the filler pipe 2. Thus, the internal pressure of the fuel tank 1 is prevented from dropping, and generation of fresh evaporative fuel gas attributed to the inflow of the outside air through the filler port can be suppressed. Further, there occurs no substantial lowering in the refueling performance attributed to the rise in the internal pressure of the fuel tank 1. When the fuel tank 1 is refueled using the evaporative gas suction type refueling system shown in FIG. 3, refueling can be carried out smoothly.

The first closing valve 221A is closed under refueling conditions. Accordingly, if refueling is continued even after the leveling valve 7 is closed, the internal pressure of the fuel tank 1 is increased to impede further fuel feeding.

When the feed nozzle is drawn out of the filler pipe 2 to close the lid 26 after completion of refueling and then the fuel cap 23 is attached to the filler port, the first closing valve 221A is opened and the second closing valve 221B is closed under the control of the ECU 125 which is responsive to a lid closing signal fed from the switch 124. Operations of the fuel storage system in this instance have already been described.

The present invention is not limited to the first to third embodiments described above but may be modified in various ways.

Figure 10:
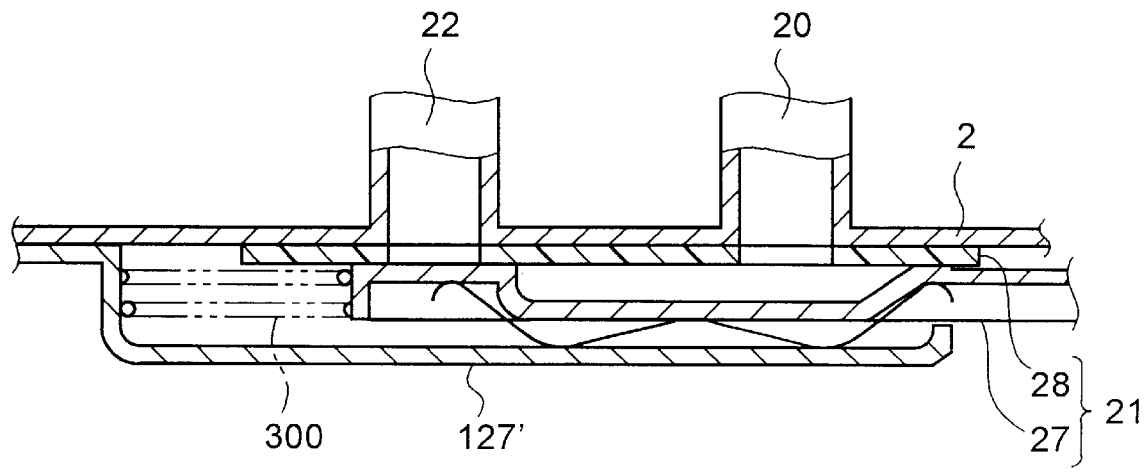
FIG. 10 is a fragmentary enlarged cross-sectional view showing a control valve driving mechanism according to a modification of the first embodiment of the present invention.

For example, while the fuel cap 23 and the driving protrusion 35 provided on the lid 26 constitute the communication/shut-off control means for switching the operational position of the valve body 27 in the control valve 21 in the first embodiment, the driving protrusion 35 may be replaced with urging means for urging the valve body 27 toward the filler port (second position). FIG. 10 shows a variation where a spring 300 is employed as the urging means. In FIG. 10, the spring 300 is abutted, at that end portion which is opposite to the filler port, against the opposing inner end face of the support 127' fixed to the filler pipe 2 and, at that end portion which opposes the filler port, against the valve body 27 at that end face which is opposite to the filler port. According to this constitution, the valve body 27 can be normally urged by the spring 300 toward the filler port.

While a slide-type control valve 21 is employed in the first embodiment, it may be replaced with a swing-type control valve.

What is claimed is:

1. A fuel storage system comprising:
   a fuel tank mounted on a vehicle;
   a filler pipe connected to said fuel tank and having a filler port at a distal end thereof;
   evaporative gas adsorbing means for adsorbing an evaporative fuel gas generated in said fuel tank;
   a vapor passage extending between said fuel tank, said evaporative gas adsorbing means and said filler pipe;
   at least one control valve disposed in said vapor passage between said evaporative gas adsorbing means and said filler pipe; and
   communication/shut-off control means for controlling said at least one control valve such that said fuel tank and said evaporative gas adsorbing means may communicate with each other under nonrefueling, whereas said evaporative gas adsorbing means and said filler pipe may communicate with each other under refueling.

2. The fuel storage system according to claim 1, further comprising a main vapor passage extending between said fuel tank and said evaporative gas adsorbing means.

3. The fuel storage system according to claim 2, wherein said vapor passage communicates to said evaporative gas adsorbing means via said main vapor passage.

4. The fuel storage system according to claim 2 or 3, further comprising a leveling valve, disposed in said main vapor passage, for preventing excessive rise of a fuel level in said fuel tank.

5. The fuel storage system according to claim 4, further comprising a cut-off valve, disposed in said vapor passage between said at least one control valve and said fuel tank, for preventing a liquid fuel from flowing out of said fuel tank into said evaporative gas adsorbing means.

6. The fuel storage system according to any one of claims 2 to 3, wherein said vapor passage opens to said fuel tank at a level higher than said leveling valve in a height direction of said fuel tank.

7. The fuel storage system according claim 6, further comprising a flow-back preventive means, disposed in said filler pipe, for preventing the fuel from flowing back from said fuel tank to said filler pipe.

8. The fuel storage system according to any one of claims 1 to 3, further comprising a cut-off valve, disposed in said vapor passage between said at least one control valve and said fuel tank, for preventing a liquid fuel from flowing out of said fuel tank into said evaporative gas adsorbing means.

9. The fuel storage system according to any one of claims 1 to 3, wherein said filler pipe has a fuel cap adapted to be removably attached to the filler port; and
   wherein said communication/shut-off control means controls said at least one control valve responding to attaching and detaching of said fuel cap to and from said filler port, so that said fuel tank and said evaporative gas adsorbing means may communicate with each other when said fuel cap is attached to said filler port, whereas said evaporative gas adsorbing means and said filler pipe may communicate with each other when said fuel cap is removed from said filler port.

10. The fuel storage system according to claim 9, wherein said at least one control valve is a single control valve having a valve body, disposed in said filler pipe at a site where said fuel cap is to be attached, said valve body being movable between a first position where said fuel tank and said evaporative gas adsorbing means communicate with each other and a second position where said evaporative gas adsorbing means and said filler pipe communicate with each other;
   wherein said communication/shut-off control means includes said fuel cap and urging means for urging said valve body toward the second position; and
   wherein said communication/shut-off control means moves said valve body to the first position with the aid of said fuel cap against an urging force of said urging means when said fuel cap is being attached, and to the second position under the urging force of said urging means when said fuel cap is being removed.

11. The fuel storage system according to any one of claims 1 to 3, wherein said filler pipe has a fuel cap adapted to be removably attached to the filler port;
   wherein said fuel storage system is provided with a lid which is disposed in said filler pipe and which is opened when a feed nozzle is inserted to said filler pipe after said fuel cap is removed from said filler port; and
   wherein said communication/shut-off control means controls said at least one control valve responding to attaching of said fuel cap to said filler port and to opening of said lid, so that said fuel tank and said evaporative gas adsorbing means may communicate with each other when said fuel cap is attached to said filler port, whereas said evaporative gas adsorbing means and said filler pipe may communicate with each other when said lid is open.

12. The fuel storage system according to claim 11, wherein said at least one control valve is a single control valve having a valve body, disposed in said filler pipe at a site where said fuel cap is to be attached, said valve body being movable between a first position where said fuel tank and said evaporative gas adsorbing means communicate with each other and a second position where said evaporative gas adsorbing means and said filler pipe communicate with each other;

wherein said communication/shut-off control means includes said fuel cap and a driving member provided on said lid for pushing said valve body toward the second position when said lid is opened; and wherein said communication/shut-off control means moves said valve body to the first position with the aid of said fuel cap when said fuel cap is being attached to said filler port, and to the second position with the aid of said driving member when said feed nozzle is inserted into said filler pipe.

13. The fuel storage system according to any one of claims 1 to 3, wherein said filler pipe has a fuel cap adapted to be removably attached to the filler port;

wherein said fuel storage system is provided with a lid which is disposed in said filler pipe and which is opened when a feed nozzle is inserted to said filler pipe after said fuel cap is removed from therefrom and is closed when said feed nozzle is not inserted to said filler pipe; and wherein said communication/shut-off control means controls said at least one control valve responding to opening and closing of said lid, so that said fuel tank and said evaporative gas adsorbing means may communicate with each other when said feed nozzle is not inserted to the filler pipe, whereas said evaporative gas adsorbing means and said filler pipe may communicate with each other when said feed nozzle is inserted to said filler pipe.

14. A fuel storage system comprising:

a fuel tank mounted on a vehicle;

a filler pipe connected to said fuel tank and having a filler port at a distal end thereof;

evaporative gas adsorbing means for adsorbing an evaporative fuel gas generated in said fuel tank;

a first vapor passage extending between said fuel tank and said evaporative gas adsorbing means;

a second vapor passage extending between said evaporative gas adsorbing means and said filler pipe;

a control valve disposed in said first vapor passage; and communication/shut-off control means for opening said control valve under nonrefueling and for closing said control valve under refueling.

15. The fuel storage system according to claim 14, further comprising a second control valve, disposed in said second vapor passage, which is closed under nonrefueling or running of said vehicle to shut off communication between said evaporative gas adsorbing means and said filler pipe.

16. The fuel storage system according to claim 14 or 15, further comprising a main vapor passage extending between said fuel tank and said evaporative gas adsorbing means.

17. The fuel storage system according to claim 16, further comprising a leveling valve, disposed in said main vapor passage, for preventing excessive rise of fuel level in said fuel tank.

18. The fuel storage system according to any one of claims 13 to 14, further comprising a leveling valve, disposed in said main vapor passage, for preventing excessive rise of fuel level in said fuel tank.

19. The fuel storage system according to claim 15, wherein said first vapor passage opens to said fuel tank at a level higher than said leveling valve in a height direction of said fuel tank.

20. The fuel storage system according to any one of claims 13 to 14, further comprising a flow-back preventive means, disposed in said filler pipe, for preventing the fuel from flowing back from said fuel tank to said filler pipe.

* * * * *